April 6, 1943. J. B. STANFORD 2,315,906
GASEOUS MIXTURE REGULATOR
Filed Aug. 14, 1941 2 Sheets-Sheet 1

INVENTOR.
JOSEPH B. STANFORD
BY J Ralph Barrow

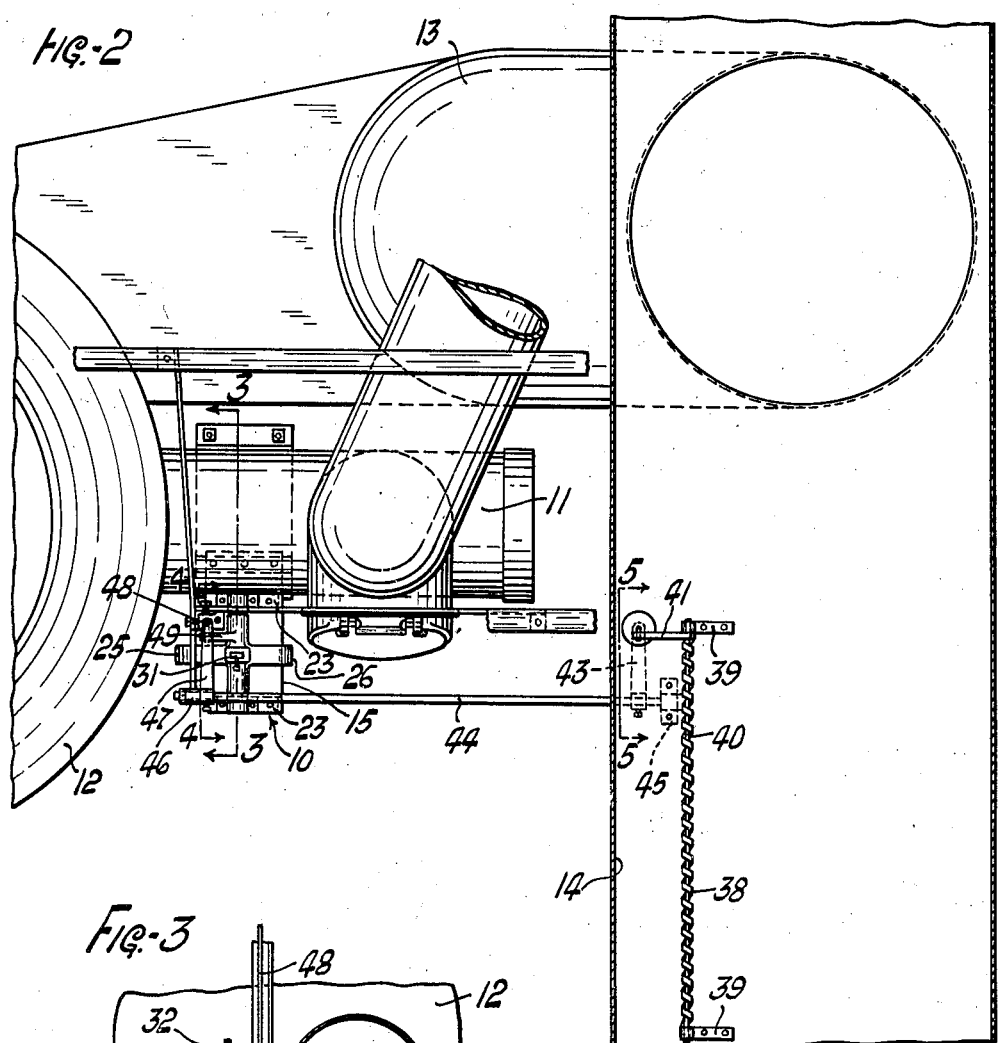
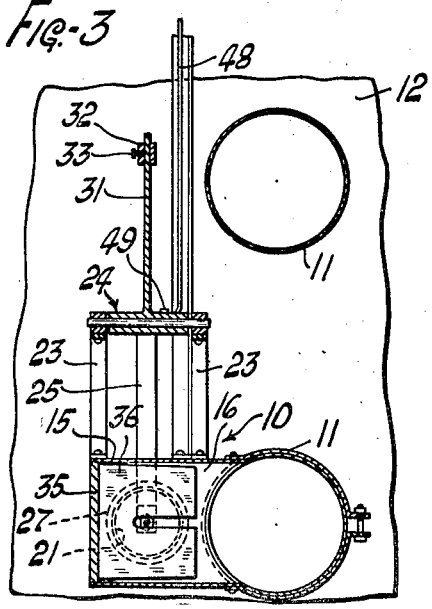
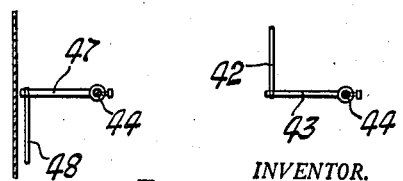

Patented Apr. 6, 1943

2,315,906

UNITED STATES PATENT OFFICE 2,315,906

GASEOUS MIXTURE REGULATOR

Joseph B. Stanford, Akron, Ohio

Application August 14, 1941, Serial No. 406,839

4 Claims. (Cl. 236—101)

This invention relates to gaseous mixture regulators or valves, as for example for regulating furnace checks and drafts.

Heretofore, there have been provided on the market regulators of the character described which were controlled by variations in temperature manifested by a thermostatic device. Such of these regulators as have been satisfactory, however, have been out of reach for certain purposes because they involved the use of elaborate and relatively expensive equipment, such as a thermostatically controlled pressure valve, a fluid or like pressure pump, a pressure storage tank, a fluid-pressure operated valve controlled by the thermostat valve, for regulating the gaseous mixture regulator, and other necessary connecting and supporting equipment. In place of the forementioned fluid-pressure equipment, relatively expensive, temperature or pressure controlled electrical devices frequently have been utilized. Obviously, installation of such elaborate equipment for controlling the checks and drafts of an average home heating system would involve unwarranted expense.

A purpose of the present invention is to provide a regulator or valve of the character described which is adapted to be effectively controlled from a remote point by relatively slight temperature or pressure variations, as for example by movement of a thermostatic device in response to temperature variations, without use of additional or booster power means controlled by the thermostatic device to operate moving parts of the regulator.

Another object of the invention is to provide a regulator of the character described for use in a conduit for gases, which is not materially affected by pressure differentials between the exterior and interior of the regulator, whereby the movable control parts of the regulator may be maintained in substantial equilibrium to facilitate control thereof.

Another object of the invention is to provide a regulator of the character described which is simple and inexpensive to produce and easy to install.

These and other objects of the invention will be manifest from the following brief description and the accompanying drawings.

Of the accompanying drawings:

Figure 2 is a cross-section taken substantially on line 2—2 of Figure 1.

Figure 3 is a fragmentary cross-section taken substantially on line 3—3 of Figure 2.

Figure 4 is a fragmentary cross-section taken on line 4—4 of Figure 2.

Figure 5 is a fragmentary cross-section taken on line 5—5 of Figure 2.

Figure 1:
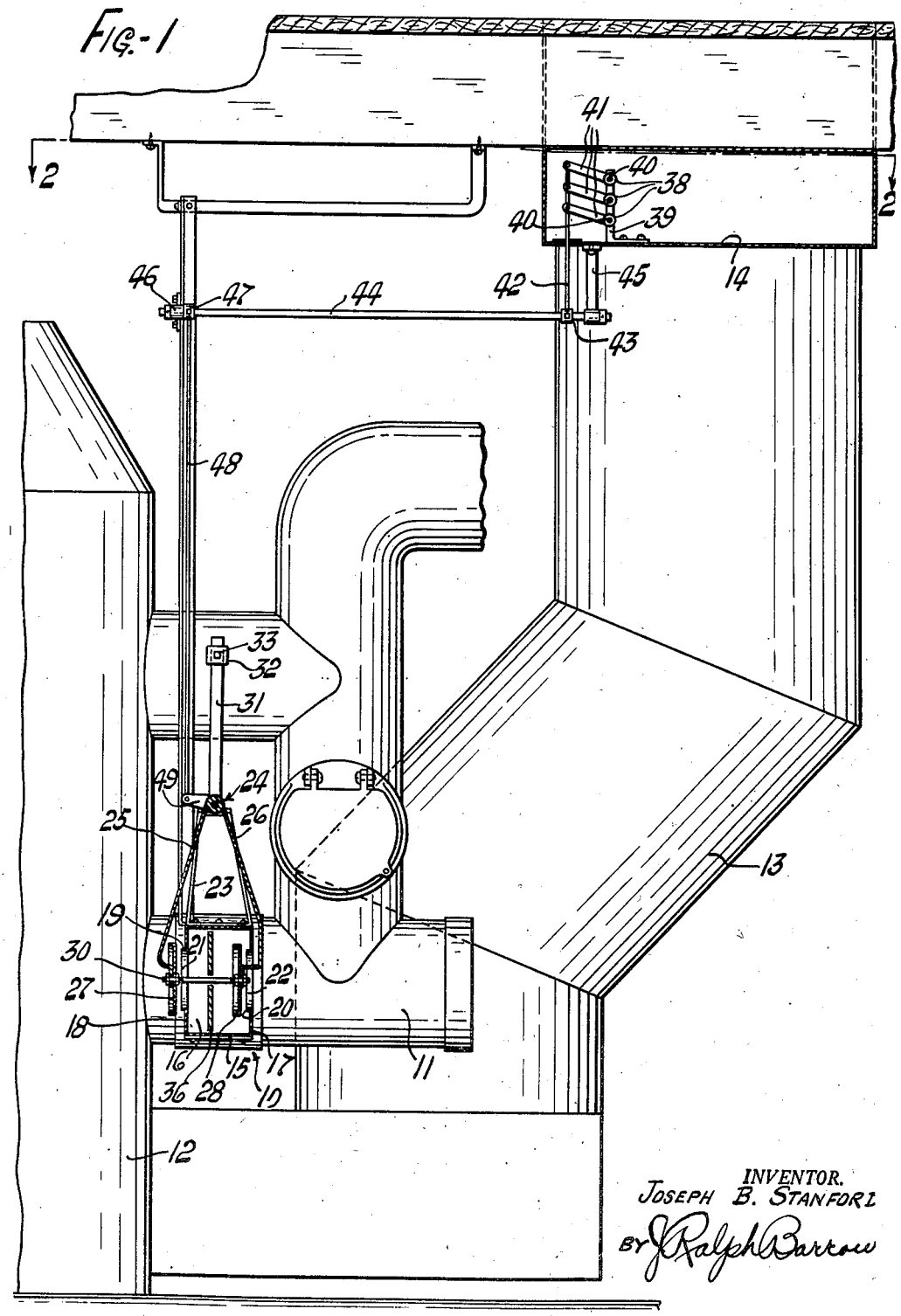
Figure 1 is an elevational view, partly broken away and in section, of a furnace having incorporated therein an improved regulator and regulator control embodying the invention.

Referring to the drawings, the numeral 10 designates, generally, an improved regulator embodying the invention as incorporated in a smoke pipe connection or conduit 11 of a furnace 12, which conduit extends to a smoke stack (not shown) in a known manner. The numeral 13 designates a cold air return conduit connecting the bottom of the hot air chamber of the furnace with a chamber 14 communicating with a cold air register of known type located in a room heated by the furnace.

Extending from the conduit 11 may be a member or casing 15 providing a chamber 16 communicating with the interior of the conduit. Spaced walls 17 and 18 of the casing may be formed with outwardly and inwardly extending annular flanges 19 and 20, respectively, defining oppositely disposed check or damper openings 21, 22. Secured on top of casing 15 is a pair of spaced supports 23, 23 between the upper ends of which may be pivotally supported a mounting 24 having downwardly extending arms or portions 25, 26, the lower ends of which are shaped to support thereon spaced disc-like closures 27 and 28 in such a manner that one closure 27 is in association with opening 21 exteriorly of casing 15 and the other closure 28 is in association with opening 22 interiorly of said casing, for purposes to be described later. The closures 27 and 28 are adjustably secured in proper spaced relation by means of a bolt 30, threaded ends of which extend through suitable apertures in the closures and in the respective arms 25, 26, the closures being clamped to said arms between double nuts on said threaded ends of the bolt.

Extending upwardly from mounting 24 may be a counterbalancing arm 31 on which a counterweight 32 is secured for sliding adjustment, as by means of a set screw 33. The arrangement is such that counterweight 32 is adjustable on arm 31 so that the mounting 24 and the parts carried thereby may be set in substantially balanced equilibrium in normal operative or neutral, partly open positions of the closures 27, 28, as illustrated in Figure 1 for example. When the furnace 12 is in operation, flue gas passing through the conduit 11 to the smoke stack will cause equal suction forces to be applied to the inner surfaces of both closures 27 and 28, suction on closure 27 tending to close check opening 21 in opposition to suction on closure 28 tending to open check opening 22. Otherwise stated, the atmospheric pressure outside casing 15 being greater than the pressure inside the casing tends to urge closure 27 inwardly to close opening 21, against equal atmospheric pressure tending to urge closure 28 inwardly to open the opening 22. Thus equal forces acting on the closures are utilized to maintain the mounting 24 and the parts carried thereby in substantially balanced condition.

On the end of casing 15 a removable closure 35, provided for cleaning the chamber 16, has secured thereto a baffle plate 36 to extend between the opening 21 and closure 28, for minimizing pressure disturbances within the casing which might affect the equilibrium of the balanced parts.

For controlling the check or damper regulator 10 in accordance with temperature variations in the cold air chamber 14, for example, one or more helical, bi-metallic thermostats 38, 38, of known type, may be mounted therein between spaced brackets 39, 39, the number of these thermostats being according to the power required to operate the regulator. One end of the coil of each thermostat is fixed while the other is free to turn in either direction about a shaft 40, extending loosely through the coil, as influenced by temperature variations, in a manner understood by those skilled in the art. On these free ends of the thermostat coils may be secured arms 41, 41 extending in parallelism, and being pivotally connected at the outer ends thereof to a light rod 42, the lower end of which is connected to the free end of an arm 43, secured on a shaft 44 journalled between suitably supported bearings 45 and 46. Also secured to shaft 44 is an arm 47 having connected to its free end a relatively light rod 48 which extends downwardly to connect the free end of an arm 49 extending from mounting 24 outwardly of the pivot thereof. Thus, any turning movement of thermostatic coils 38, in either direction, will swing the arms 41 thereof up or down, the movement of the ends of these arms being transmitted through rod 42, shaft 44, and rod 48 to swing the mounting 24 on its pivot, and thereby move the closures 27, 28, toward or from the openings 21, 22, distances corresponding to the movement of the thermostats.

In the operation of the apparatus described above various movable parts including closures 27 and 38 will be in the relative positions best shown in Figure 1, in which it is assumed that the furnace 12 is operating in desired normal manner. Should there be a drop in temperature, for example, in the rooms heated by the furnace, the temperature will drop correspondingly in the cold air return chamber 14, thereby affecting the thermostats 38 to swing arms 41 downwardly. This, through rod 42, shaft 44, and rod 48, will cause the mounting 24 to swing to the right (Figure 1) and move both closures 27 and 28 toward openings 21 and 22 a corresponding amount, and thereby cause the furnace to have improved draft, by reducing the flow of air through said openings into the smoke pipe. Conversely, as the temperature of the air in chamber 14 increases toward a desired point, the thermostats 38 are affected to swing arms 41 upwardly, thereby swinging mounting 24 to the left (Figure 1) to widen the gap between closures 27, 28 and openings 21, 22.

Thus has been provided a regulator for the purposes described, in which the movable parts are maintained in such substantially balanced equilibrium, that it may be operated directly by means of a relatively delicate temperature responsive element in a thermostat, thereby obviating the usual necessity of having pressure or electrically operated power means to transform a relatively small force of such a thermostat element into a force of sufficient power to operate the moving parts of a regulator. The present invention is capable of many uses other than described above. It may, for example, be utilized in substantially the same manner for regulating the direct draft of a furnace. Similarly, it may be utilized for mixing heated and cooled air in air-conditioning systems.

It is understood that the connecting means between the thermostats 38 and mounting 24 may be modified to suit conditions. For instance, a flexible resilient cable of known type may be utilized in place of the various operating rods, shafts, etc.

Other modifications of invention may be resorted to without departing from the spirit thereof or the scope of the appended claims.

What is claimed is:

1. A regulator of the character described comprising a duct having two openings therein, a valve closure member associated with each opening, one on the inside of the duct, and the other on the outside of the duct, and each movable to and from the associated opening, and means for mounting said valve closures to move in unison, simultaneously toward closed positions or toward open positions, said means comprising a freely movable member for balancing the weights of said valve closures, said valve closures being mounted on said member whereby their weights substantially balance each other.

2. The combination with a regulator as set forth in claim 1, of a thermostatic device having an element shiftable in response to temperature variations, said element being connected to said freely movable member on which said valve closures are balanced.

3. A regulator of the character described comprising a duct having two openings therein, a valve closure member associated with each opening, one on the inside of the duct, and the other on the outside of the duct, and each movable to and from the associated opening, and means for mounting said valve closures to move in unison, simultaneously toward closed positions or toward open positions, said means comprising a freely movable member for balancing the weights of said valve closures, said valve closures being mounted on said member whereby their weights substantially balance each other, said freely movable member comprising a beam or lever mounted upon a fulcrum and subject to the action of gravity, and said valve closures being mounted upon said beam or lever at opposite sides of said fulcrum.

4. The combination with a regulator as set forth in claim 3, of a thermostatic device having an element shiftable in response to temperature variations, said element being connected to said freely movable member on which said valve closures are balanced.

JOSEPH B. STANFORD.